DANIELS & COBB.
Bee Hive.
No. 31,658.
Patented March 12, 1861.
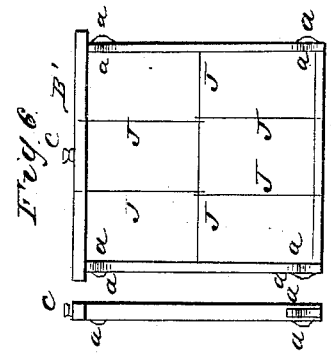
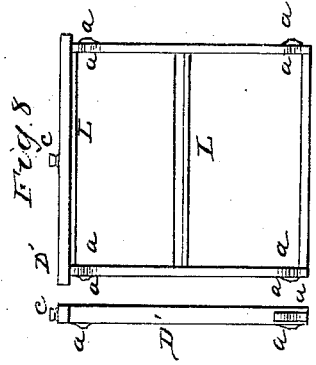
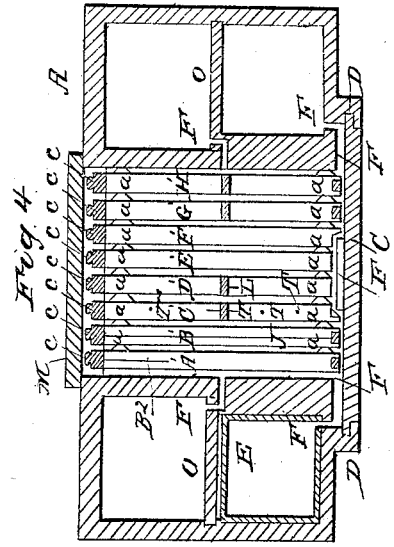
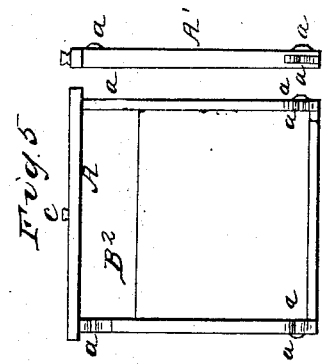
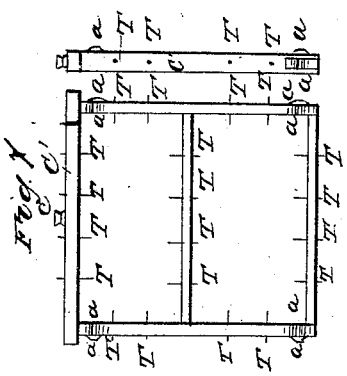
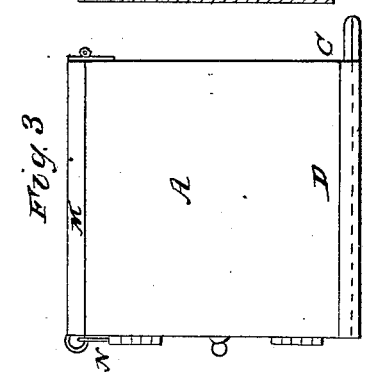
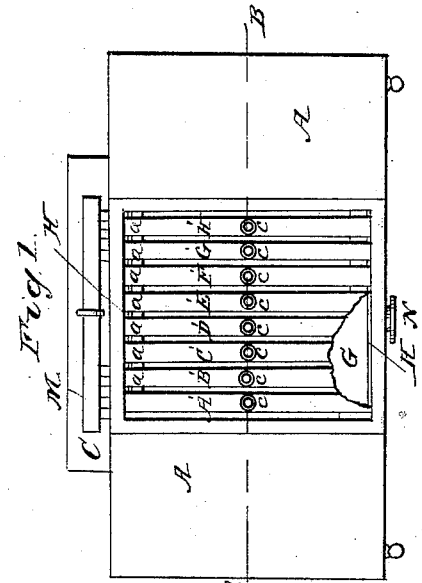
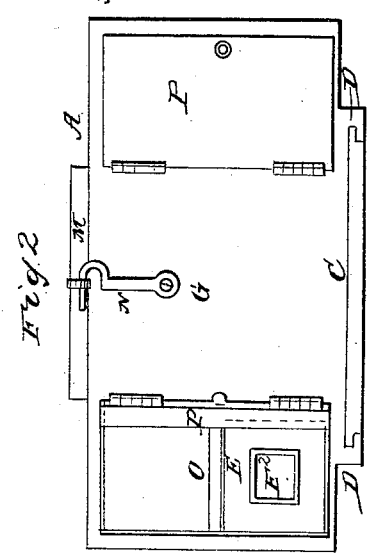
Witnesses
E. Gay
W. G. Crauch
Inventors
Reuben Daniels & Gaius P. Cobb
By Atty E. W. Scott

UNITED STATES PATENT OFFICE.

R. DANIELS AND G. P. COBB, OF WOODSTOCK, VERMONT.

BEEHIVE.

Specification of Letters Patent No. 31,658, dated March 12, 1861.

*To all whom it may concern:*

Be it known that we, REUBEN DANIELS and GAINS P. COBB, both of Woodstock, in the county of Windsor and State of Vermont, have invented a new and useful Improvement in Beehives; and we hereby declare that the following specification, in connection with the accompanying drawings and letters of reference marked thereon, constitutes a lucid, clear, and exact description of the construction and use of the same.

In referring to the said drawings, Figure 1, denotes a plan or top view of the entire hive, the lid being open. Fig. 2, a back side elevation with the lid closed. Fig. 3, an end elevation of the same. Fig. 4, a central, vertical, and longitudinal section on line A, B, of Fig. 1, with the lid closed. Fig. 5, a side and end elevation of one of the comb frames, having our artificial comb fixed therein and ready to be placed within the hive. Fig. 6, a side and end elevation of comb frames having small wires stretched across; around and on to which the comb is to be built, and by which it is sustained. Fig. 7, a side and end elevation of comb frame provided with movable needles; by which the comb can be secured after being placed within the frame. Fig. 8, a side and end elevation of comb frame having a thin web of suitable material fixed to it, and the bars thereof to readily receive and securely retain the comb.

The nature of our invention consists in providing comb frames with guiding blocks; by which all portions of these frames are so guided, when being placed within, or removed from the hive or remaining therein as to effectually avoid contact of the comb or honey and to prevent approach or contact of frames with the interior of the hive and also so as to avoid contact with the next contiguous frame or crushing the comb and honey; also, in providing comb frames with small wires as cross bars around and on to which the bees may build and secure their comb, without essentially impeding their progress; also, in providing the comb frames with needles, by which comb can be placed within the frames, and there secured by passing these needles through the frames and into the comb; also, in providing the comb frame with thin ribs secured around, and in the frame to facilitate the formation of the comb, and in imparting an additional security to it when formed.

*Construction.*—To enable persons skilled in the art to which our invention appertains, to construct and carry out the same we will describe it as follows:

We construct the main portion of the hive, of any suitable form, and substance, or as seen at A. in the drawings, having a sliding bottom seen at C. which is connected by slides D. to hive A. and a swinging or movable lid or cover M. and secured by clasp N, this cover and sliding bottom allowing full access to the comb frames and the space they occupy. Each end portion of the hive may be provided with partitions O. and movable honey boxes seen at E. and the glass at $F^2$, to be inclosed by doors P. suitably hinged to hive A. the passage for the bees being seen at F. they first entering the central portion of the hive from without, and then to the movable honey boxes E.

The central portion of the hive G. is provided with shoulders H, on which the several comb frames A'. B'. C'. D'. E'. F'. G'. H'. are suspended. These frames are neatly made of wood, and across any desired portion of them are stretched and secured, three or more small wires J. see Fig. 6. The object and advantage of employing these small wires, instead of wood cross bars of equal width of the thickness of the frames, as has been heretofore known, is this, viz. to allow the bees to build or form a large comb readily around and on to these small stay wires without hindrance or essentially impeding their progress, the comb being of equal size and occupying the entire inside of the frame, these small wires being in the center of the comb, or such portion of it as to securely retain the comb within the frames and with no interruption to the bees in pursuing their work.

The old comb frames made like a window sash, with cross bars as thick as the frame itself, renders it necessary for the bees to begin and finish the work of making a complete comb, in each of the several squares in each frame, while our comb frame allows the making of one large entire comb to fill or occupy the entire frame and secured by the small stay wires without any annoyance to the bees.

We also construct comb frames as seen at C'. and at Fig. 7, having small sliding needles T, which after the comb is placed within the frames may be pressed through these frames and into the comb to hold it therein. One purpose of this frame is to easily place and secure any required amount of comb from an ordinary hive within the frames for feeding the bees. These frames may also, if desired, be used by the bees, in which to first form their comb.

We also construct comb frames as seen at D'. and at Fig. 8, with thin ribs of any suitable material seen at L, Fig. 8, and attached to the frame firmly to facilitate the commencement of the comb, by the bees, by allowing the comb to be more readily and easily formed to this rib L. than it could be to the ordinary flat surface of the comb frame heretofore known. Any number of these ribs may be applied to the frames around and in, the central portion of the inside of the framework, or as desired.

We fabricate an artificial comb, in thin sheets, seen at $B^2$, using tissue paper or any fibrous or suitable material or substance, saturated or coated with wax or any suitable substance, to be placed in the center of the frame and to form the central portion of the comb between the honey cells or such portion thereof as desired and from which the bees may draw their supply of material for constructing the different portions of the comb, or otherwise, thus both providing the bees with a form or gage and the materials of which to make their comb at the very spot where they are most wanted and without going out of the hive, thus producing a much larger quantity of honey in a given time than the bees could otherwise accomplish.

It is very important that no portion of the comb frame carrying the honey should approach, come, or remain in contact with the interior of the hive, so as not to be affected by shrinking or swelling of the frame or hive, and to not allow the bees to unite their comb both to the comb frame and the hive, as they would do, were the hive and comb frame to come in contact with each other, which avoids breaking the comb in removing the frame, thus keeping the comb frames intact from the hive, and at the same time all portions of the frames at all positions are effectually and accurately guided, which is of the greatest importance.

All the comb frames are provided with guide blocks seen at $a$, and at each of their ends so as to both keep these frames apart from each other and at the required distance from the sides and surface of the hive, and to so guide all portions of these frames, in removing them from, and replacing them in the hive as to prevent contact or crushing of the comb or honey, all as herein set forth. The knobs $c$ are for removing and replacing the comb frames within the hive.

Having thus described our invention, we claim—

1. Providing the removable and replaceable comb frames constructed as described with guide blocks for so guiding all portions of these frames in placing them in and taking them out of the hive, as to prevent the comb in the frames and the frames themselves from contact with the hive, or comb and honey of the next contiguous frames, and preventing the bees uniting their comb to both hive and frame.

2. Providing the comb frames with small wires for effectually sustaining the comb, and around and on to which the bees may build and unite their comb without impeding their progress.

3. Providing the comb frames with movable needles for securing the comb after being placed therein from the common hive.

4. Providing the comb frames with thin ribs L. fixed around and on the inside and central portion of the comb frame to facilitate the commencing of the comb by the bees, and continuing their work, and in securely retaining the comb when formed.

REUBEN DANIELS.
GAINS P. COBB.

Witnesses:
JOHN DANIELS,
GEORGE L. RAYMOND.